(12) United States Patent
Chun et al.

(10) Patent No.: US 7,561,524 B2
(45) Date of Patent: Jul. 14, 2009

(54) METHOD FOR MEASURING PERFORMANCE OF MPLS LSP

(75) Inventors: Kyung Gyu Chun, Daejeon (KR); Soon Seok Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 430 days.

(21) Appl. No.: 11/510,405

(22) Filed: Aug. 25, 2006

(65) Prior Publication Data

US 2007/0133540 A1 Jun. 14, 2007

(30) Foreign Application Priority Data

Dec. 8, 2005 (KR) .................. 10-2005-0119228

(51) Int. Cl.
*H04L 12/26* (2006.01)
(52) U.S. Cl. ................... 370/236.2; 370/241.1
(58) Field of Classification Search ............. 370/236.2, 370/241–253; 714/800–805
See application file for complete search history.

(56) References Cited

U.S. PATENT DOCUMENTS

| 2005/0022046 | A1* | 1/2005 | Cheng et al. ............... 714/4 |
| 2005/0169182 | A1 | 8/2005 | Klink |
| 2006/0039364 | A1* | 2/2006 | Wright ................. 370/352 |
| 2007/0064611 | A1* | 3/2007 | He ....................... 370/236.2 |

FOREIGN PATENT DOCUMENTS

| KR | 1020000020254 | 4/2000 |
| KR | 1020000058645 | 10/2000 |
| KR | 2001-0057812 | 7/2001 |
| KR | 2002-0025427 | 4/2002 |
| KR | 2003-0074944 | 9/2003 |
| KR | 1020030082842 | 10/2003 |

OTHER PUBLICATIONS

International Telecommunication Union, ITU-T Y.1711: Operation & Maintenance Mechanism for MPLS Networks, Feb. 2004, pp. 4-7.*

* cited by examiner

*Primary Examiner*—Chirag G Shah
*Assistant Examiner*—Otis L Thompson, Jr.
(74) *Attorney, Agent, or Firm*—Ladas & Parry LLP

(57) ABSTRACT

Provided is a method for measuring performance of a multi-protocol label switching label switched path (MPLS LSP), using a fast failure detection (FFD) packet among MPLS operation and management (OAM) packets recommended by International Telecommunication Union-Telecommunication standardization sector (ITU-T) Y.1711 to detect a packet error generated in the MPLS LSP and newly defining bytes not used in the FFD frame to use the bytes for parity check.

An ingress node performs the steps of: calculating a parity value of an MPLS packet as byte interleaved parity (BIP)-8 before transmitting the MPLS packet; storing the calculated parity value of the MPLS packet in an MPLS OAM packet of an FFD structure; and transmitting the MPLS OAM packet whenever transmitting the MPLS packet. And an egress node performs the steps of: calculating a parity value of a received MPLS packet; comparing a parity value of an MPLS packet stored in the MPLS OAM packet with the parity value of the received MPLS packet; and when the two parity values are not identical, determining that an error has occurred in the MPLS packet and discarding the MPLS packet.

7 Claims, 4 Drawing Sheets

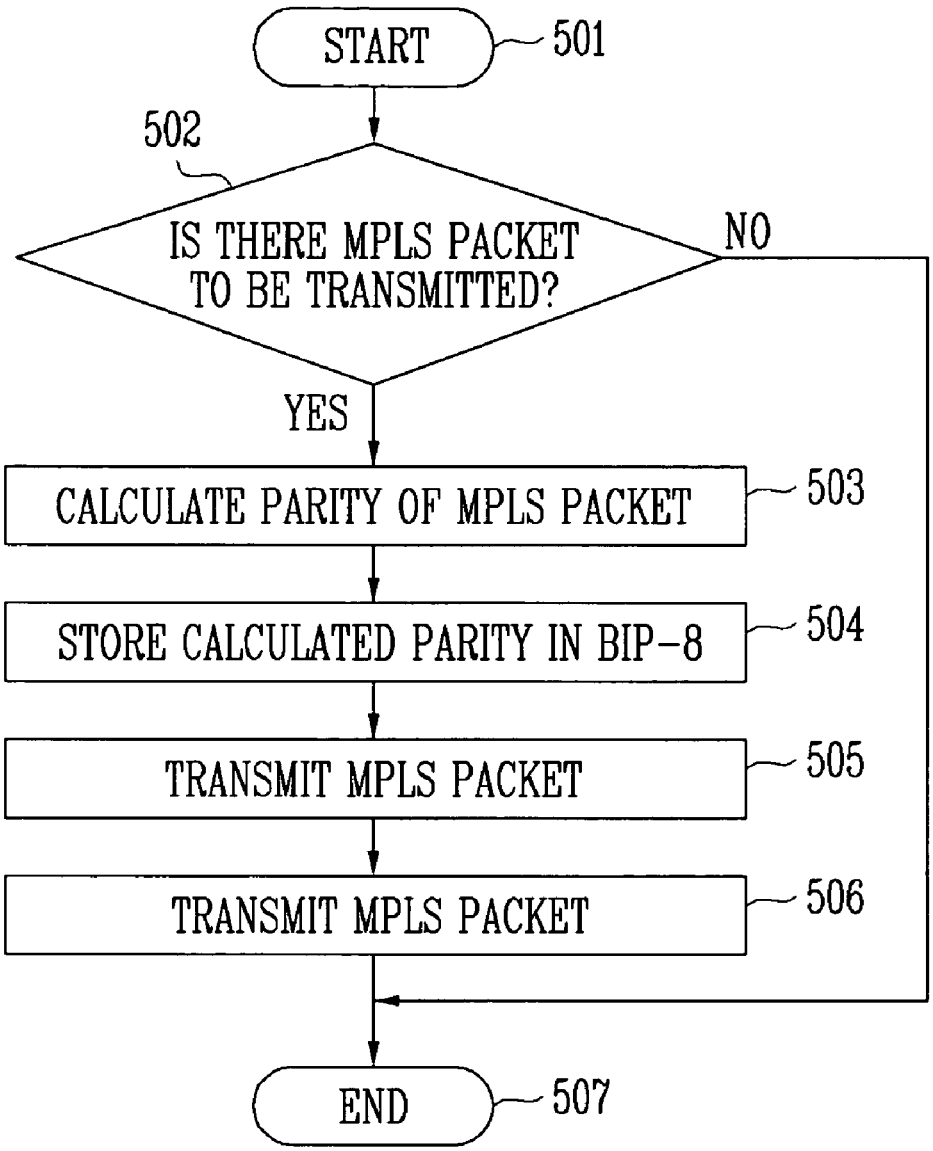

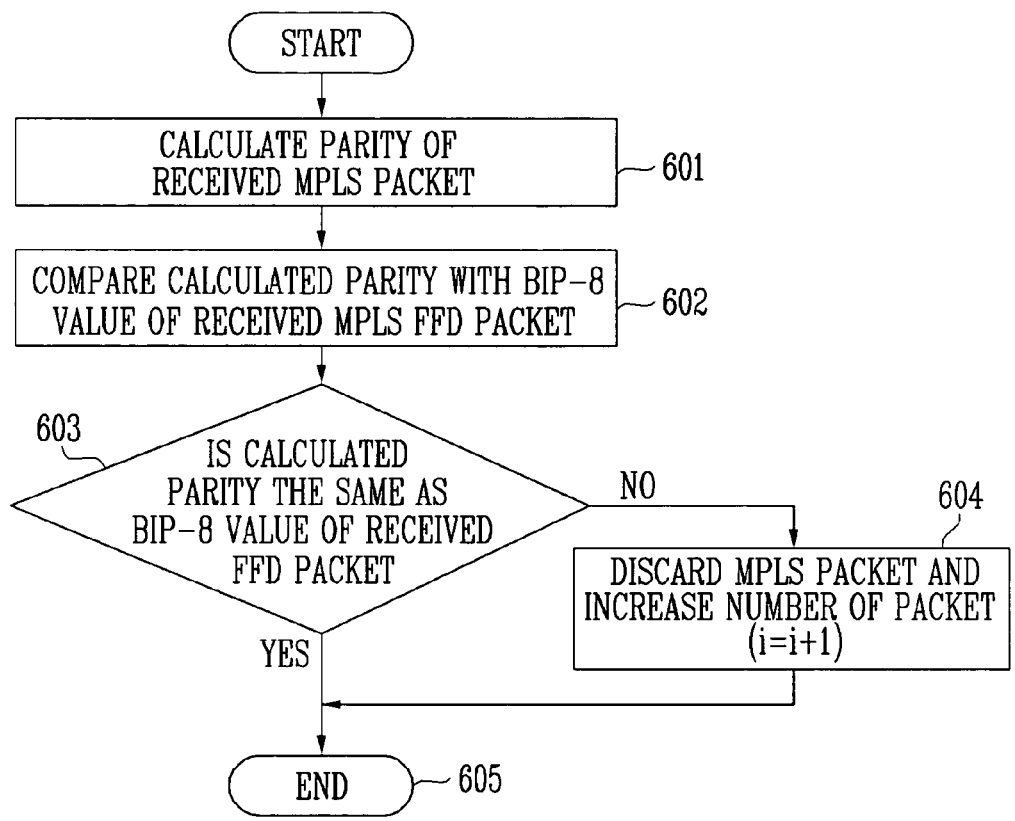

METHOD FOR MEASURING PERFORMANCE OF MPLS LSP

CROSS-REFERENCE TO RELATED APPLICATION

This application claims priority to and the benefit of Korean Patent Application No. 2005-119228, filed Dec. 8, 2005, the disclosure of which is incorporated herein by reference in its entirety.

BACKGROUND

1. Field of the Invention

The present invention relates to a method for measuring performance of a label switched path (LSP) using a multi-protocol label switching operation and management (MPLS OAM) packet in an MPLS network, and more particularly, to a method for detecting an error generated in a packet while the packet is transmitted from an ingress node to an egress node using an MPLS OAM packet.

2. Discussion of Related Art

Parity is generally used to determine whether there is an error in a received signal between two terminals. More specifically, when a signal transmitting terminal calculates a parity value of a transmitting frame and transmits the parity value to a signal receiving terminal, the signal receiving terminal recalculates a parity value of a receiving frame and compares the recalculated parity value with the parity value transmitted from the transmitting terminal to thereby detect an error.

According to optical transmission technology such as synchronous digital hierarchy (SDH)/synchronous optical network (SONET), a receiving terminal detects an error using a method for calculating parity of a frame to be transmitted in units of a byte, i.e., byte interleaved parity (BIP). In addition, in the above equipment, dedicated overhead bytes capable of transferring the calculated BIP value is assigned to a frame.

However, since an MPLS network does not have such a function used for SDH/SONET, it is currently impossible to detect an error of an MPLS packet.

Therefore, when an error is generated in an LSP due to a failure or performance degradation of an MPLS network, it is difficult to determine whether or not an error of an MPLS packet is generated.

SUMMARY OF THE INVENTION

It is an object of the present invention to detect an error of a received packet using bytes reserved in a fast failure detection (FFD) packet among multi-protocol label switching operation and management (MPLS OAM) packets recommended by International Telecommunication Union-Telecommunication standardization sector (ITU-T) Y.1711 for MPLS packet parity check.

One aspect of the present invention provides a method for measuring performance of an MPLS LSP, comprising the steps of: calculating, at an ingress node of the MPLS LSP, a parity value of an MPLS packet before transmitting the MPLS packet; storing the parity value of the MPLS packet in an MPLS OAM packet; and transmitting the MPLS OAM packet whenever transmitting the MPLS packet.

Another aspect of the present invention provides a method for measuring performance of an MPLS LSP, comprising the steps of: receiving, at an egress node of the MPLS LSP, an MPLS packet and an MPLS OAM packet; calculating a parity value of the received MPLS packet; comparing the parity value of the received MPLS packet with a parity value of an MPLS packet stored in the MPLS OAM packet; and when the parity values are not identical, discarding the MPLS packet, increasing the number of generated MPLS packet errors by 1, and storing the number.

BRIEF DESCRIPTION OF THE DRAWINGS

The above and other features and advantages of the present invention will become more apparent to those of ordinary skill in the art by describing in detail preferred exemplary embodiments thereof with reference to the attached drawings in which:

FIG. 5 is a flowchart showing a process in which an ingress node transmits BIP-8 according to an exemplary embodiment of the present invention; and FIG. 6 is a flowchart showing a process in which an egress node detects an error using BIP-8 according to an embodiment of the present invention.

DETAILED DESCRIPTION OF EXEMPLARY EMBODIMENTS

Hereinafter, exemplary embodiments of the present invention will be described in detail. However, the present invention is not limited to the exemplary embodiments disclosed below and can be implemented in various forms. Therefore, the present exemplary embodiments are provided for complete disclosure of the present invention and to fully inform the scope of the present invention to those of ordinary skill in the art.

Figure 1:
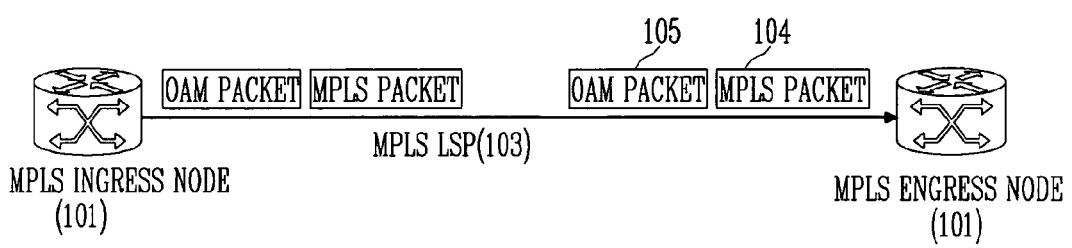
FIG. 1 is a constitution diagram of a network for monitoring performance of a multi-protocol label switching label switched path (MPLS LSP) according to an exemplary embodiment of the present invention.

FIG. 1 is a constitution diagram of a network for monitoring performance of a multi-protocol label switching label switched path (MPLS LSP) according to an exemplary embodiment of the present invention, describing an ingress node and an egress node only. Since transit nodes between the ingress node and the egress node merely forward packets, a description of the transit nodes will be omitted. An MPLS ingress node 101 transmits an MPLS packet 104 through an MPLS LSP 103 and then transmits an MPLS operation and management (OAM) packet 105 having a parity value of the MPLS packet. In other words, the ingress node generates and transmits an MPLS OAM packet each time an MPLS packet is generated. When receiving the MPLS packet 104, an MPLS egress node 102 necessarily receives the MPLS OAM packet 105 to determine whether or not an MPLS packet error has been generated.

Figure 2:
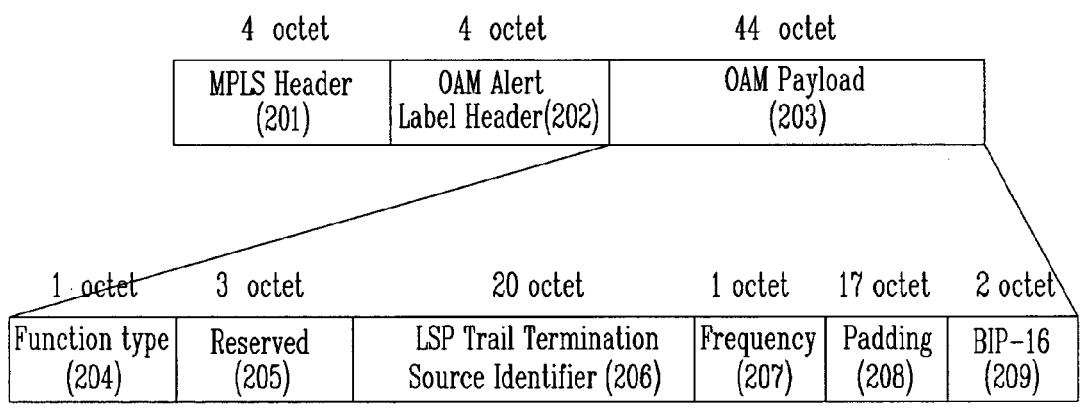
FIG. 2 illustrates the structure of an MPLS operation and management (OAM)-fast failure detection (FFD) packet.

FIG. 2 illustrates the structure of a fast failure detection (FFD) packet among MPLS OAM packets recommended by International Telecommunication Union-Telecommunication standardization sector (ITU-T) Y.1711. In the structure, an MPLS Header 201 consists of 4 octets, an OAM Alert Label Header 202 consists of 4 octets, and an OAM Payload 203 consists of 44 octets. The OAM Payload 203 includes a field "Function Type" 204 of 1 octet indicating an OAM packet type, a field "Reserved" 205 of 3 octets currently not being used, a field "Trail Termination Source Identifier (TTSI)" 206 of 20 octets indicating an LSP address of an ingress node, a field "Frequency" 207 of 1 octet indicating a transmission interval of the FFD packet, a field "Padding" 208 of 17 octets having a value of 0 only, and a field "bit interleaved parity (BIP)-16" 209 storing a parity value of the OAM Payload therein. In the present invention, one of the 3 octets of the field "Reserved" 205 is used for MPLS packet parity calculation.

Figure 3:
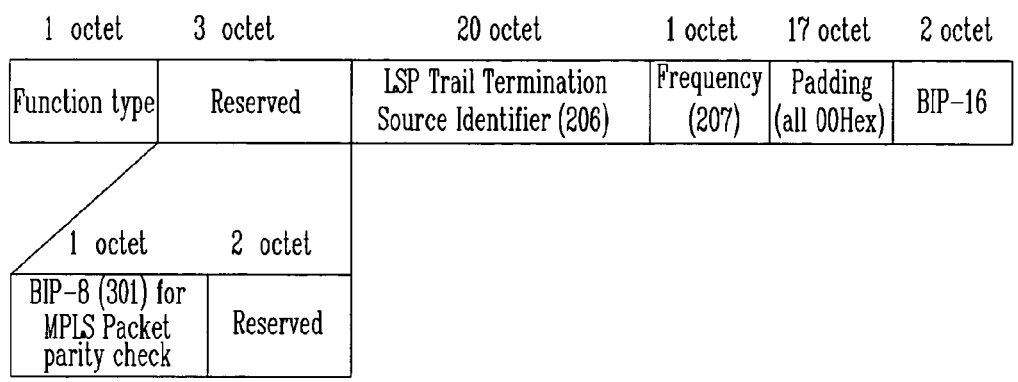
FIG. 3 illustrates the structure of an MPLS OAM-FFD packet including bit interleaved parity (BIP)-8 according to an exemplary embodiment of the present invention.

FIG. 3 illustrates the structure of an MPLS OAM Payload according to an embodiment of the present invention. In the structure, one of 3 octets of a field "Reserved" is used for parity bytes "BIP-8" 301 for MPLS packet parity check, a value of one octet of a field "Frequency" 207 is set to "00Hex", so that a new function not used by ITU-T Y.1711 is defined and whenever an MPLS packet is transmitted, used for transmitting an FFD packet.

Figure 4:
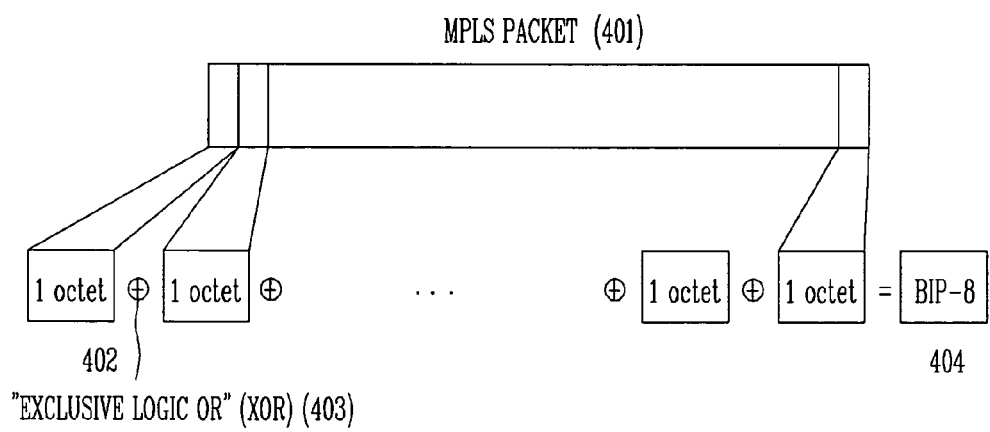
FIG. 4 illustrates a parity calculation method for an MPLS packet according to the present invention.

FIG. 4 illustrates a parity calculation method for an MPLS packet 401. MPLS frames including an MPLS header are successively subjected to an exclusive logic OR operation "Exclusive OR" 403 in units of one octet 402, and a value "BIP-8" 404 results from the calculation of all the octets. The value "BIP-8" 404 calculated in this manner is stored in the "BIP-8" 301 of FIG. 3 for MPLS packet parity check.

FIG. 5 is a flowchart showing a process in which an ingress node transmits an FFD packet for parity check through an MPLS LSP. First, in step 502, it is checked whether or not there is an MPLS packet to be transmitted. When there is an MPLS packet to be transmitted, a parity value "BIP-8" of the MPLS packet is calculated in step 503. Subsequently, the calculated result is stored in the FFD packet in step 504, the MPLS packet is transmitted in step 505, and the FFD packet is transmitted in step 506.

FIG. 6 is a flowchart showing a process in which an egress node detects and handles an error of a received MPLS packet. First, in step 601, a parity value of the received MPLS packet is calculated. In step 602, the calculated value is compared with a value "BIP-8" of an FFD packet received subsequent to the MPLS packet. In step 603, it is checked whether or not the two values are identical. When the two values are not identical, it is determined that an error has occurred in the MPLS packet, the MPLS packet is discarded, and the number of MPLS packet errors is increased by 1, in step 604. On the contrary, when the two values are identical, it is determined that the MPLS packet is a normal packet, and then the process described above is repeated for the next packet.

In addition, the process may further comprise calculating the number of packet errors generated per second, accumulating the number for a predetermined time period, and when the number of packet errors exceeds a predetermined critical value, generating an automatic LSP switching request signal in order to measure performance of an MPLS LSP.

The present invention allows an egress node to detect an error generated during transmission in watching an MPLS LSP. Thus, signal error detection, which has been possible at only an optical transmission apparatus such as synchronous digital hierarchy (SDH)/synchronous optical network (SONET), is possible even in an MPLS packet network, allowing performance of the MPLS LSP to be measured. According to the performance measurement method, the number of packet errors generated per second may be calculated and then accumulated for a predetermined time period, and when the accumulated number of packet errors exceeds a predetermined threshold value, an automatic LSP switching request signal for protection switching may be used. Accumulation of the number of packet errors for a time period of 15 minutes or 1 hour can make long-time performance measurement for the LSP possible, providing a judgment criterion for an operator to take proper action upon performance deterioration. In addition, an erroneous MPLS packet is discarded not to be processed in an upper layer than MPLS, thereby reducing system load.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for measuring performance of a multi-protocol label switching label switched path (MPLS LSP), comprising the steps of:
   receiving, at an egress node of the MPLS LSP, an MPLS packet and a separate MPLS OAM packet associated with the MPLS packet;
   calculating a parity value of the received MPLS packet;
   comparing the parity value of the received MPLS packet with a parity value of an MPLS packet stored in the MPLS OAM packet associated with the MPLS packet; and
   when the parity values are not identical, discarding the MPLS packet, increasing the number of generated MPLS packet errors by 1, and storing the number,
   wherein the parity value of the MPLS packet stored in the MPLS OAM packet is calculated by performing an exclusive logic OR operation on the MPLS packet in units of octet to calculate a value of byte interleaved parity (BIP)-8.

2. The method according to claim 1, wherein the MPLS OAM packet is a fast failure detection (FFD) packet, and a parity value of the MPLS packet is stored in bytes reserved in OAM Payload of the FFD packet.

3. The method according to claim 1, further comprising the step of generating an automatic LSP switching request signal when the number of generated MPLS packet errors stored for a predetermined time period exceeds a threshold value.

4. A method for measuring performance of a multi-protocol label switching label switched path (MPLS LSP), comprising the steps of:
   calculating, at an ingress node of the MPLS LSP, a parity value of an MPLS packet before transmitting the MPLS packet;
   storing the calculated parity value of the MPLS packet in a multi-protocol label switching operation and management (MPLS OAM) packet; and
   transmitting the MPLS OAM Packet whenever transmitting the MPLS packet,
   wherein the step of calculating a parity value of the MPLS packet comprises the step of performing an exclusive logic OR operation on the MPLS packet in units of octet to calculate a value of byte interleaved parity (BIP)-8.

5. The method according to claim 4, wherein the MPLS OAM packet is a fast failure detection (FFD) packet, and a parity value of the MPLS packet is stored in bytes reserved in OAM Payload of the FFD packet.

6. A method for measuring performance of a multi-protocol label switching label switched path (MPLS LSP), comprising the steps of:
   calculating at an ingress node of the MPLS LSP, a parity value of an MPLS packet before transmitting the MPLS packet;
   storing the calculated parity value of the MPLS packet in a multi-protocol label switching operation and management (MPLS OAM) packet; and transmitting the MPLS OAM packet whenever transmitting the MPLS packet, wherein the step of transmitting the MPLS OAM packet whenever transmitting the MPLS packet comprises the step of setting a value of 1 octet of a field "Frequency" included in a payload of the MPLS OAM packet to "00Hex".

7. The method according to claim 6, wherein the MPLS OAM packet is a fast failure detection (FFD) packet, and a parity value of the MPLS packet is stored in bytes reserved in OAM Payload of the FFD packet.

* * * * *